(12) United States Patent
Halter

(10) Patent No.: US 10,045,480 B2
(45) Date of Patent: Aug. 14, 2018

(54) AGRICULTURAL MACHINE COMPRISING AN IMPROVED DEVICE FOR CONTROLLING A SHIELD

(71) Applicant: KUHN S.A., Saverne (FR)

(72) Inventor: Cedric Halter, Wasselonne (FR)

(73) Assignee: KUHN S.A., Saverne (FR)

( * ) Notice: Subject to any disclaimer, the term of this patent is extended or adjusted under 35 U.S.C. 154(b) by 0 days.

(21) Appl. No.: 15/308,776

(22) PCT Filed: May 4, 2015

(86) PCT No.: PCT/FR2015/051182
§ 371 (c)(1),
(2) Date: Nov. 3, 2016

(87) PCT Pub. No.: WO2015/170045
PCT Pub. Date: Nov. 12, 2015

(65) Prior Publication Data
US 2017/0172062 A1    Jun. 22, 2017

(30) Foreign Application Priority Data
May 6, 2014   (FR) ..................................... 14 54086

(51) Int. Cl.
*A01D 34/00*   (2006.01)
*A01D 69/00*   (2006.01)
(Continued)

(52) U.S. Cl.
CPC .......... *A01D 34/006* (2013.01); *A01B 63/008* (2013.01); *A01B 71/08* (2013.01);
(Continued)

(58) Field of Classification Search
CPC ...... A01D 34/008; A01D 34/80; A01D 34/00; A01D 69/00; A01D 75/20; A01D 69/02;
(Continued)

(56) References Cited

U.S. PATENT DOCUMENTS 5,727,371 A    3/1998   Kieffer et al.
2003/0229425 A1   12/2003   Miedema

FOREIGN PATENT DOCUMENTS

DE   20 2011 101 223 U1   3/2012
EP        1 369 025 A1    12/2003
(Continued)

OTHER PUBLICATIONS

International Search Report dated Aug. 3, 2015 in PCT/FR2015/051182 filed May 4, 2015.

*Primary Examiner* — Robert E Pezzuto
(74) *Attorney, Agent, or Firm* — Oblon, McClelland, Maier & Neustadt, L.L.P.

(57) ABSTRACT

An agricultural machine including at least one working tool which can be driven by a drive mechanism which can have a variable drive speed, at least one movable shield which can be moved at least between operational and non-operational positions, and a device for moving the at least one shield, including at least one adjusting actuator and a device for locking the shield. The movement device includes a circuit for controlling the actuator which includes the locking device, which circuit automatically converts a variable input quantity into a control quantity which can adopt a first control value used to prevent the adjusting actuator from being moved out of a first configuration, the input quantity being a value which is a function of or dependent on the drive speed of the drive mechanism or on the working speed of the at least one tool.

22 Claims, 11 Drawing Sheets

(51) Int. Cl.
*A01B 63/00* (2006.01)
*A01B 71/08* (2006.01)
*A01D 80/00* (2006.01)
*A01D 41/14* (2006.01)
*B60R 16/027* (2006.01)
*A01D 101/00* (2006.01)

(52) U.S. Cl.
CPC ......... *A01D 41/145* (2013.01); *A01D 69/002* (2013.01); *A01D 80/00* (2013.01); *B60R 16/027* (2013.01); *A01D 2101/00* (2013.01)

(58) Field of Classification Search
CPC ...... A01D 80/00; A01D 41/014; A01D 43/00; A01D 34/006; A01D 69/002; A01D 41/145; A01B 63/00; A01B 63/008; A01B 71/08; B60R 16/027
USPC .......... 56/10.2 A–10.2 E, 10.2 R, 14.9, 15.8, 56/157, 214, 208, 255, 283, 6, 7; 172/2–11, 272, 273, 439
See application file for complete search history.

(56) References Cited

FOREIGN PATENT DOCUMENTS

| | | |
|---|---|---|
| FR | 2 687 891 A1 | 9/1993 |
| FR | 2 726 152 A1 | 5/1996 |

| Working tool in transport (or possibly intermediate) position | Working tool in working position | Control quantity = 1st control value | Control quantity = 2nd control value | Adjusting actuator in 1st configuration or in 2nd configuration |
|---|---|---|---|---|
| X ↓ | | X | | 1st configuration (maintenance) |
| X | | | X | 2nd configuration (preferably automatically) |
| | X | X | | 1st configuration (preferably automatically) |
| | X | | X | 1st configuration (preferably automatically) |

Fig. 8

AGRICULTURAL MACHINE COMPRISING AN IMPROVED DEVICE FOR CONTROLLING A SHIELD

FIELD

The present invention relates to the field of agricultural machines, especially agricultural machines having at least one working tool driven by a motor means, such as a power takeoff of a tractor, and with a protective device comprising at least one protective means, which can be moved between operational and non-operational positions.

In this context, the invention relates more particularly to an agricultural machine having an improved device for controlling at least one protective means.

The protection of tools and mechanisms of machines, and above all the protection of users and of the public, is a major concern in the field of agricultural machinery in general and of agricultural machines with rotating and/or cutting movable tools in particular.

The protective devices employed must of course be reliable, robust and capable of achieving sufficient confinement of the tools, while also permitting easy access to the tools whenever necessary (cleaning, maintenance, repair) or more generally permitting the displacement of at least certain components of the said protective devices between at least two positions or configurations (operational/non-operational; working/transport).

DESCRIPTION OF THE RELATED ART

In this context the Applicant has already proposed several solutions, such as, for example:

In document FR 2621213, a haymaking machine in which lateral parts of the machine can be raised by jacks, wherein this raising action entrains automatic raising of their associated protective means by way of a system of links. In the raised state, the protective means define a confined protective volume around the tools.

In document FR 2687891, a mower with a two-part protective member, in which the two protective parts are automatically displaced from their working position toward their transport position during raising of the cutting member, by way of maneuvering elements of the cable+spring type. The maintenance of the parts of the protective member in raised position is of elastic nature.

In document FR 2678804, a haymaking machine with a device for protection of the raking zone and an adjustable lateral deflector, in which the adjusting jack of the deflector also serves to raise the two constituent parts of the protective device. A separate mechanism for locking the two protective parts in raised position is also provided.

In document FR 2726152, an agricultural machine for cutting plants with a protective device having a movable front part that cannot be raised manually as long as the cutting mechanism is in working position. In addition, the said front part is locked in raised position by a catch and is able to return to lowered position under its own weight or in assisted manner.

In document FR 2704385, an agricultural machine of forage swather type with a protective device having two manually collapsible lateral parts. A mechanical lock for blocking the wheel of the swather in rotation is provided, wherein this lock also prevents the lateral parts of the safety device from being collapsed (into uncovered position) as long as the tool is turning.

Nevertheless, these known systems all have a separate specific mechanism or locking device that in general must be maneuvered manually.

More broadly speaking, these known systems do not provide any integrated means for locking the protective device in position that is compatible with manual displacement or transposition or that is activated by the tool or tools while also taking into account all of the safety parameters associated with this tool or these tools.

Furthermore, document EP A 1369025 teaches a motorized agricultural machine that is autonomous (in other words functioning without an operator) comprising a cutting unit with which a movable protective hood is associated, wherein this hood can be displaced between an active position in which it covers the tool and an inactive position in which it releases or uncovers the tool.

The said machine also comprises a displacement sensor, which is part of a global position determining system (geo-tracking of the machine) and which delivers a signal for control of the position of the protective hood, wherein the latter is in inactive position when the machine is in motion and in active position when the machine is stationary.

Nevertheless, neither the activation of the tool in itself nor its position is taken into account for the determination of the position of the protective hood. In addition, no specific device for locking the hood is provided.

SUMMARY

The object of the present invention is to alleviate at least the major inconveniences and to overcome at least the main limitations of the different solutions mentioned hereinabove.

In addition, the invention is supposed to make it possible to maintain safety locking automatically and if possible to avoid the need for human intervention in the different manipulations of the agricultural machine. Finally, the means used are supposed to be limited.

To this end, the invention has as its object an agricultural machine comprising:
at least one working tool that can be driven by a drive means capable of presenting a variable drive speed, resulting in a variable working speed for the tool in question, wherein this working tool can be displaced or transposed at least between a working position or configuration and a transport position or configuration,
at least one movable protective means capable of being displaced at least between an operational position, in which it surrounds and/or covers the working tool at least partly, and a non-operational position, in which the working tool in question is at least partly accessible,
a device for displacing the said at least one protective means capable of displacing this latter at least between the aforesaid operational and non-operational positions, wherein this displacement device has at least one adjusting actuator supplied by energy delivered from an external energy source,
a device for locking the protective means in at least one of the positions of this latter,
wherein the machine is characterized in that
the displacement device comprises a circuit for controlling the actuator or each adjusting actuator so as to permit at least a transposition of the adjusting actuator in question into or toward a first configuration, in which the protective means in question is disposed in its operational position, as well as a transposition of the adjusting actuator in question into or toward a second configuration, in which the protective means in question can be disposed in its non-operational position, the control circuit integrates the locking device of the protective means in question and is such that it permits or prevents the adjusting actuator in question from being disposed in its first configuration when the working tool in question is disposed in its working position or configuration, the locking device automatically transforms a variable input quantity into a control quantity of the adjusting actuator in question, wherein this control quantity can assume a first control value used to prevent a transposition of the said adjusting actuator beyond its first configuration, the input quantity presents a value that is a function of or dependent on the drive speed of the drive means or of the working speed of the said at least one tool in question, the control quantity assumes and preserves the first control value as long as the input quantity presents a value that is representative of the drive speed of the drive means and/or of the working speed of the said at least one tool in question that is higher than a threshold speed.

BRIEF DESCRIPTION OF THE DRAWINGS

The invention will be better understood by virtue of the description hereinafter, which relates to a preferred embodiment, presented by way of non-limitative example and explained with reference to the attached schematic drawings, wherein:

FIG. 8 is an example of a truth table indicating the configuration of the adjusting actuator of a guard constituting part of the agricultural machine according to the invention, as a function of the position of the tool in question and of the condition of drive or working speed of the tool.

DETAILED DESCRIPTION

Figure 1:
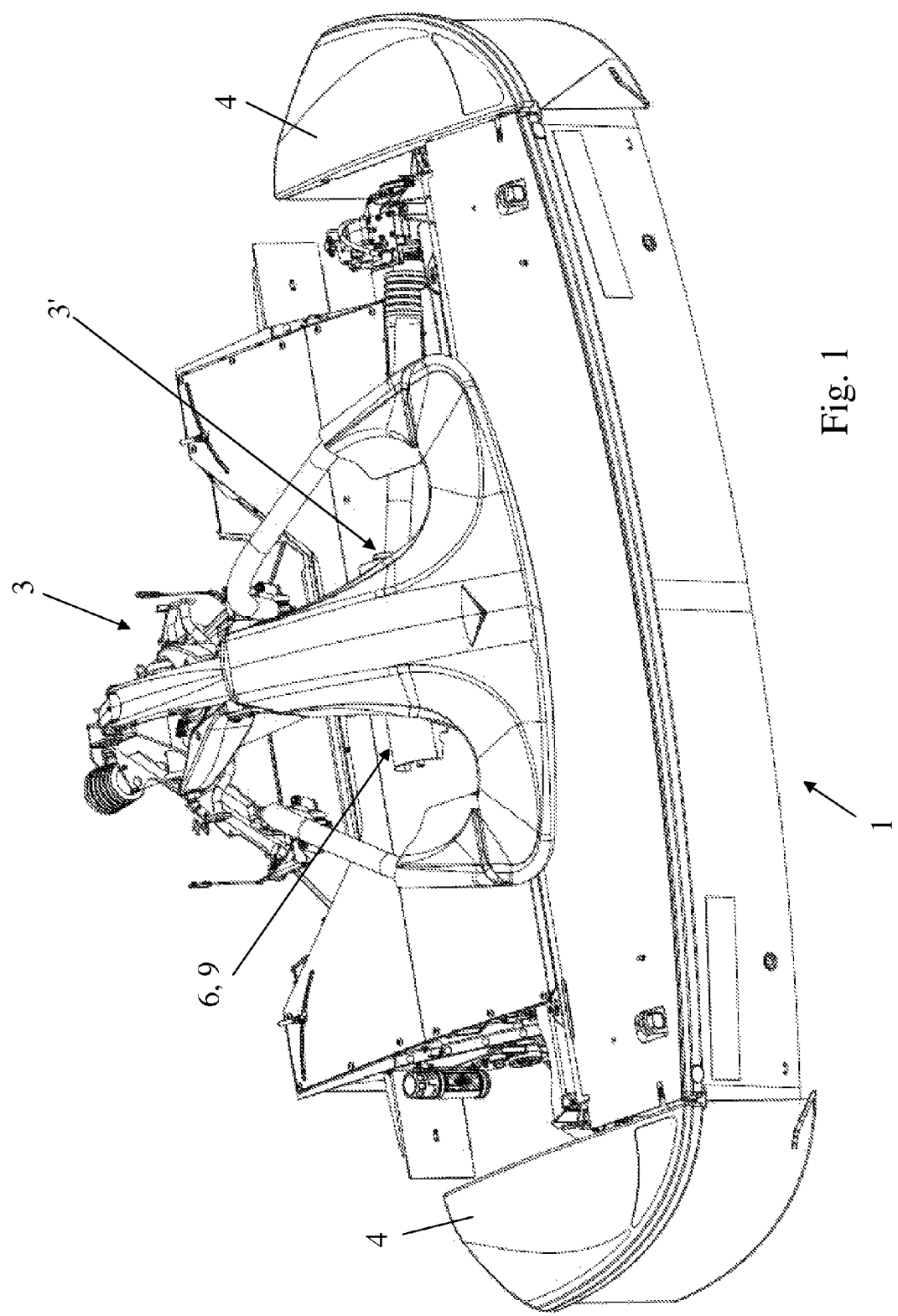
FIG. 1 is a perspective front view of an agricultural machine according to the invention, in the form of a front-mounted mower.
Figure 2:
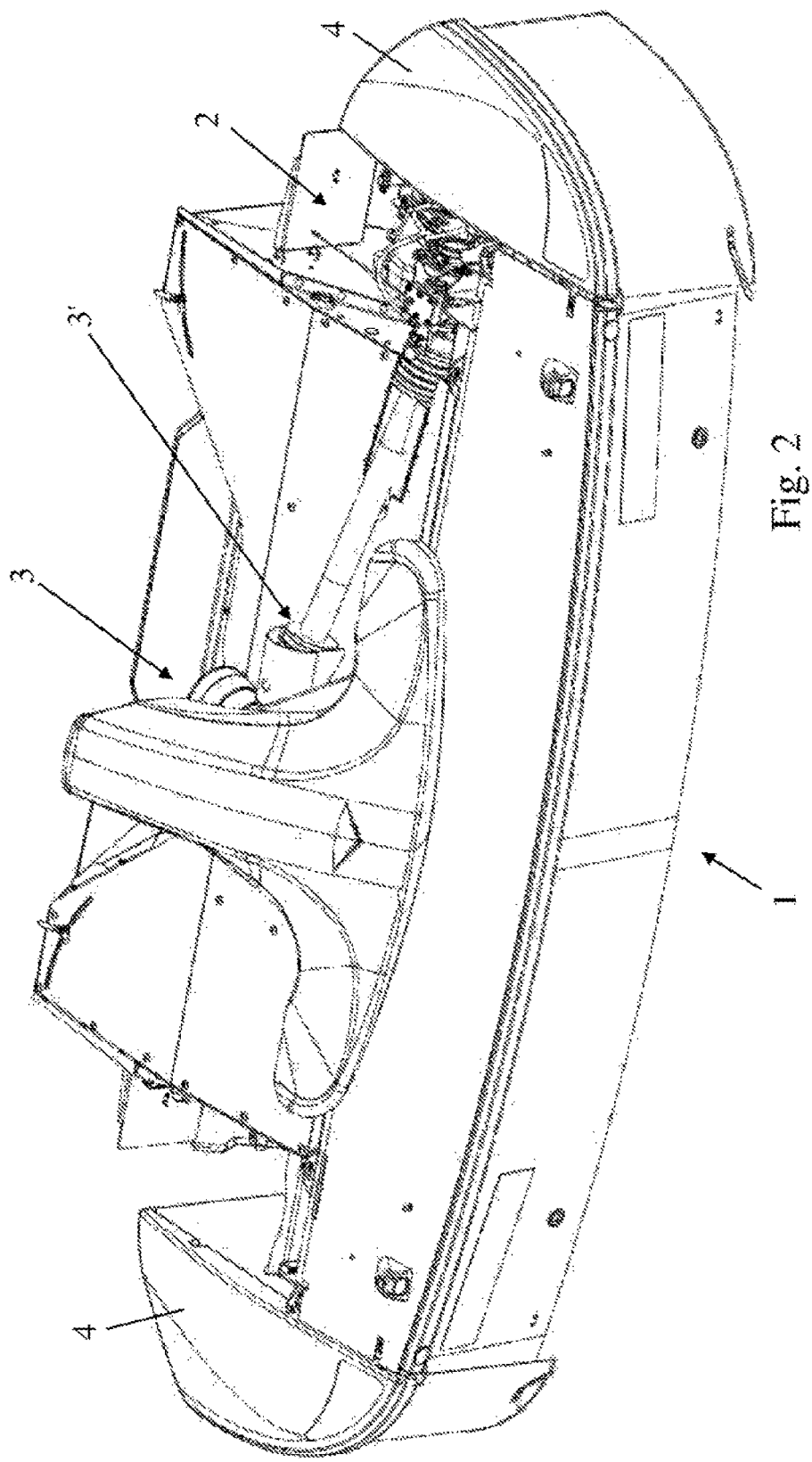
FIG. 2 is a perspective and partly transparent view in a different direction of the agricultural machine represented in FIG. 1.

The attached figures show, partly or in total, an agricultural machine 1 comprising:

at least one working tool 2 that can be driven by a drive means 3 capable of presenting a variable drive speed, resulting in a variable working speed for the tool 2 in question, wherein this working tool 2 can be displaced or transposed at least between a working position or configuration and a transport position or configuration, at least one movable protective means 4 capable of being displaced at least between an operational position, in which it surrounds and/or covers working tool 2 at least partly, and a non-operational position, in which working tool 2 in question is at least partly accessible, a device 5 for displacing the said at least one protective means 4 capable of displacing this latter at least between the aforesaid operational and non-operational positions, wherein this displacement device 5 has at least one adjusting actuator 7 supplied by energy delivered from an external energy source 8, a device 6 for locking the protective means 4 in at least one of the positions of this latter.

In the present document, "drive speed" and "working speed" concern the movement speeds specific to the means respectively in question, in other words drive means 3 and tool 2, and not the speed of displacement of these means resulting from the displacement of the agricultural machine 1.

In general, and especially when agricultural machine 1 is a machine being towed or carried by a tractor or analogous vehicle, the drive speed of means 3 is a speed of rotation, in particular the speed of rotation resulting from the connection of means 3 forming the input shaft of the machine 1 with the power takeoff of the tractor or analogous vehicle.

Similarly, when working tool 2 is a rotating tool, the working speed is a speed of rotation.

In conformity with the invention, it is provided that:

the displacement device 5 comprises a circuit 9 for controlling the actuator or each adjusting actuator 7 so as to permit at least a transposition of the adjusting actuator 7 in question into or toward a first configuration, in which protective means 4 in question is disposed in its operational position, as well as a transposition of adjusting actuator 7 in question into or toward a second configuration, in which protective means 4 in question can be disposed in its non-operational position, control circuit 9 integrates locking device 6 of protective means 4 in question and is such that it permits or prevents adjusting actuator 7 in question from being disposed in its first configuration when working tool 2 in question is disposed in its working position or configuration, locking device 6 automatically transforms a variable input quantity into a control quantity of adjusting actuator 7 in question, wherein this control quantity can assume a first control value used to prevent a transposition of the said adjusting actuator 7 beyond its first configuration, the input quantity presents a value that is a function of or dependent on the drive speed of drive means 3 or of the working speed of the at least one tool 2 in question, the control quantity assumes and preserves the first control value as long as the input quantity presents a value that is representative of the drive speed of drive means 3 and/or of the working speed of the said at least one tool 2 in question that is higher than a threshold speed (of respectively drive or working).

Thus, by virtue of the aforesaid inventive provisions, the adjusting actuator 7, which is capable of and designed to displace at least one protective means 4, is also used to block this protective means 4 (in operational position) when certain criteria or certain safety conditions are or are not verified or fulfilled, in particular criteria or conditions concerning the state (for example: position, movement) of working tool 2 in question. Thus no separate blocking or locking component or element is required.

As far as locking device 6 is concerned, its role is to convert the safety conditions associated with the drive or with the work of tool 2 in question into a control quantity of adjusting actuator 7 in question, either to permit it to maneuver or to block it (in a safe condition of machine 1) as long as the said safety conditions are or are not verified.

These latter do not concern only the position or the configuration of working tool 2 in question (protective means 4 obligatorily in operational position when associated tool 2 is in working position), but also its state of activation or energization, and more generally the transmission or the absence of transmission of kinetic energy to the at least present tool 2 or more generally to agricultural machine 1, by an on-board motor means or by an external motor means, as accomplished by way of a drive means 3, such as, for example, an input shaft connected to a power takeoff of a tractor, or else an intermediate transmission shaft 3'.

The person skilled in the art understands that the agricultural machine 1 considered in the present document may comprise one or many working tools 2 and one or many movable protective means 4. A single protective means 4 may surround or cover at least partly one or many tools 2 or, as a variant, several protective means 4 may surround or cover at least partly or entirely a single working tool 2 or each one or many associated working tools 2.

Similarly, displacement device 5 may comprise one or many adjusting actuators 7, as a function in particular of the number of protective means 4 present, wherein each adjusting actuator 7 can be associated with one or many protective means 4, for example by way of adapted link elements, and may be of single-effect or double-effect type (by being integral or not with the machine frame).

Although the description hereinafter deals more particularly, in relationship to the attached figures, with an embodiment of the invention that employs a single adjusting actuator 7 in association with one or two movable protective means 4, all the possible variants and combinations mentioned in the foregoing must also be considered as being comprised within the scope of protection of the invention.

In addition, the protective mean(s) 4 considered in the present document may adopt different forms, structures, sizes and constitutions, so that they are identical to or different from one another, and correspond to one part only or to the entirety of a protective device.

Similarly, their displacement between their different positions may take place in different ways: translation, rotation or complex movement resulting from the combination of different elementary movements (performed simultaneously or successively).

In addition, the operational and non-operational positions of the, at least one or many guard(s) 4 present on the agricultural machine 1 may, as a function of its or of their constitution and/or implementation, correspond not only to two different locations or positions of this/these guard(s) 4 but also to two different states or two different configurations of the(se) latter.

Thus, in the case of a guard 4 that is partly or totally deformable, for example between a deployed state and an at least partly collapsed state (case of a canvas fixed on a collapsible rigid structure or mounted slidingly on a rail), the operational and non-operational positions may correspond to two different extension configurations of the or of each guard 4 in question, associated or not with a displacement of this latter.

In agreement with a first additional measure for safeguarding machine 1 as provided by the invention, control circuit 9 of adjusting actuator 7 in question is such that, when working tool 2 in question is displaced from its transport position or configuration toward its working position or configuration, the said adjusting actuator 7 is automatically transposed toward its first configuration.

In addition, and in relation with additional safeguarding of machine 1 depending on the actuation or energization of this latter, control circuit 9 may be such that, starting from an initial configuration of machine 1, in which working tool 2 in question is in its working position and in which the control quantity assumes the first control value, adjusting actuator 7 remains in its first configuration during a subsequent displacement of working tool 2 toward its transport position or configuration or toward an intermediate position or configuration situated between the working position or configuration and the transport position or configuration while the control quantity preserves or continues to assume the first control value.

The unlocking that permits changeover of the or each guard 4 from its operational position toward its non-operational position or preceding such an automatically induced changeover thus necessitates the simultaneous existence of two conditions (cumulative conditions), in other words, on the one hand, an intermediate or transport position or configuration of tool 2 in question and, on the other hand, a movement speed of the said tool 2 lower than or at a predetermined threshold value.

The intermediate position may correspond, for example, to a position of passing an obstacle or of passing a swath for an agricultural machine 1 of haymaking type.

In complementary manner, it may be provided that locking device 6 is constructed in such a way that the control quantity of adjusting actuator 7 in question assumes a second control value when the input quantity presents a value representative of a drive speed of drive means 3 or a working speed of tool 2 in question that is lower than or equal to the threshold speed, wherein the second control value is used to permit a transposition of adjusting actuator 7 between its first configuration and its second configuration.

Finally, additionally, control circuit 9 may be designed in such a way that, when working tool 2 in question is transposed or displaced toward its transport position or configuration or toward an intermediate position or configuration situated between the working position and the transport position, while the control quantity assumes the second value, adjusting actuator 7 is automatically transposed toward its second configuration.

Figure 3A:
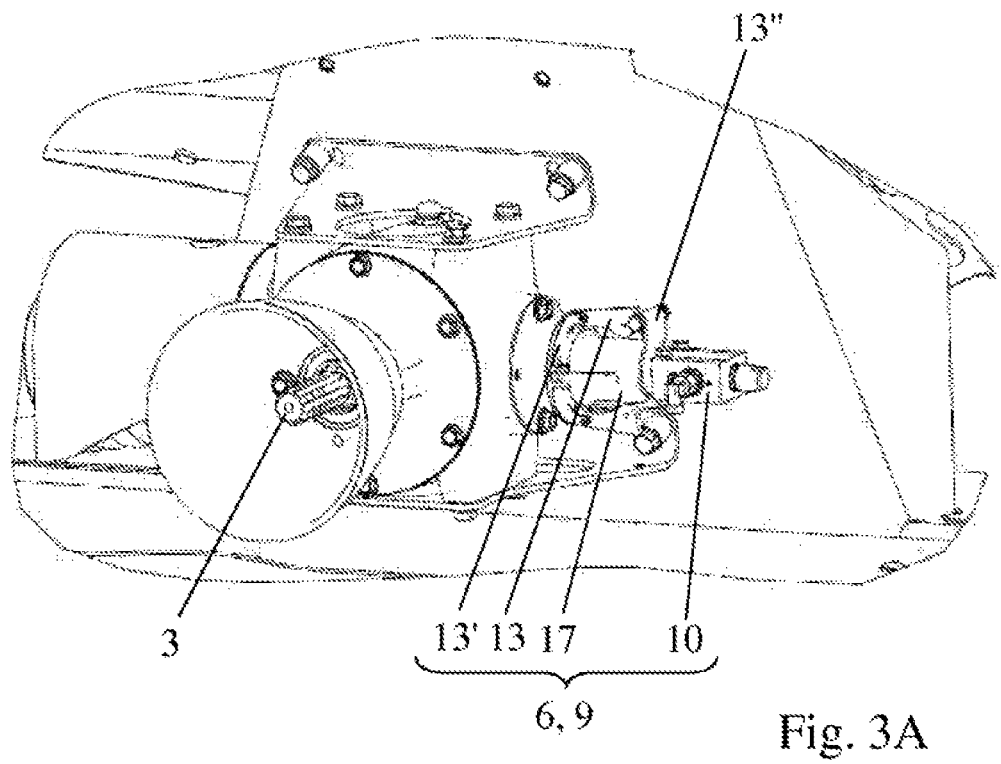
FIGS. 3A and 3B are detail views, on a different scale, of part of the control circuit of at least one adjusting actuator of at least one movable protective means forming part of the agricultural machine represented in FIGS. 1 and 2 and integrating the locking device, according to a first variant of an embodiment of the invention, wherein the locking device is respectively configured to deliver a first and a second control value.
Figure 3B:
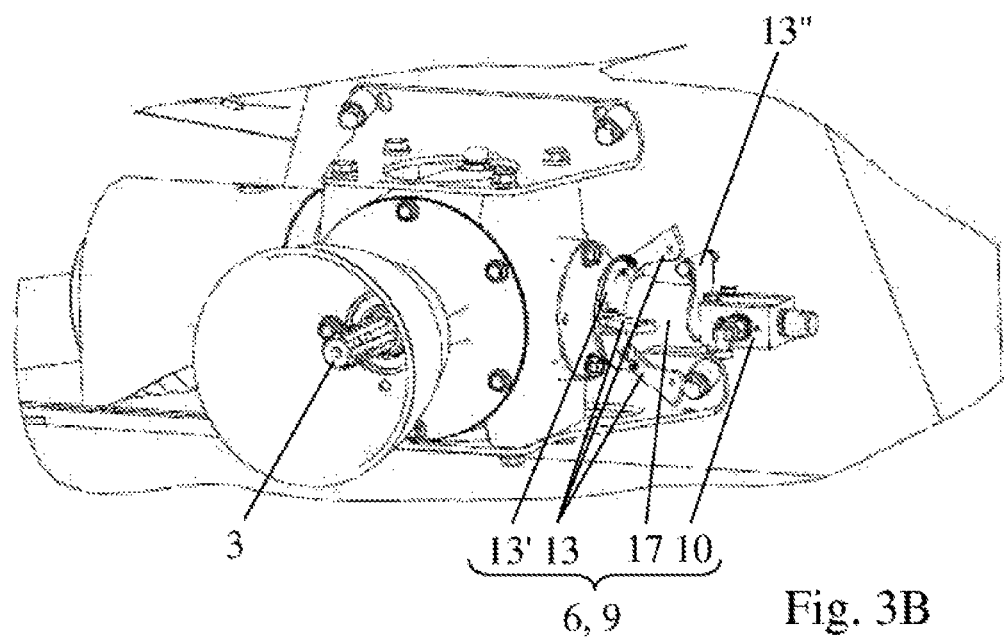
Figure 7:
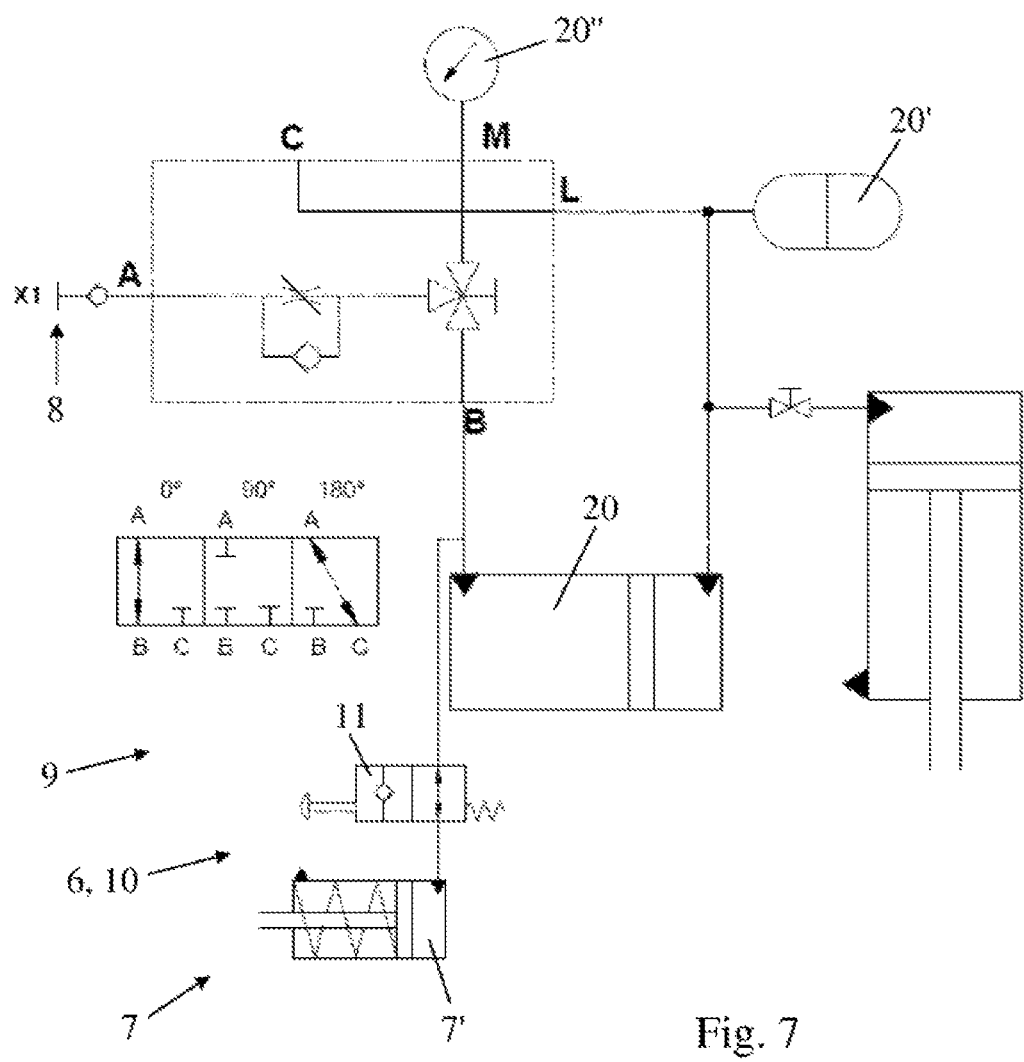
FIG. 7 is a simplified fluidic diagram of the displacement device of FIGS. 5 and 6.

In conformity with a preferred embodiment of the invention, derived in particular from FIGS. 3 and 7, locking device 6 may have a selector means 10 connected to external energy source 8 to steer the maneuvering or the functioning of the adjusting actuator 7 in question under the effect of the external energy, wherein the state of this selector means 10 constitutes the control quantity of adjusting actuator 7 and selector means 10 is able to present a first state constituting the first value of the control quantity and a second state constituting the second value of the control quantity.

According to a practical alternative embodiment of control circuit 9, in relationship in particular with the employment of an adjusting actuator 7 of fluidic nature, this latter may have a first part 7' capable of receiving a flow of external energy from external energy source 8, wherein selector means 10 is connected to first part 7' and wherein first part 7' receives this flow of external energy from external energy source 8 when adjusting actuator 7 is transposed from its first configuration toward its second configuration.

As FIG. 7 shows, selector means 10 may comprise a non-return means 11 that, when it is active or is selected to be placed in series in the supply circuit, prevents a flow of external energy from external energy source 8 toward first part 7' of adjusting actuator 7, but permits a flow of external energy in the opposite circulation direction, wherein non-return means 11 is active when selector means 10 is in its first state.

In addition, selector means 10 is also designed in such a way that, in its second state, it permits a bidirectional energy flow, both from external energy source 8 toward first part 7' and from first part 7' toward external energy source 8.

The hydraulic circuit represented in FIG. 7 may also comprise, in traditional manner, a lift pump 20 associated with an accumulator 20' and a manometer 20".

According to an additional characteristic of the invention, compatible in particular with an adjusting actuator 7 of pneumatic or hydraulic type, but also of electric type, external energy source 8 may present a zero energy potential when working tool 2 in question is displaced toward/is disposed in its working position or configuration and a non-zero energy potential when working tool 2 in question is displaced toward/is disposed in its transport position or configuration or in a (the) intermediate position or configuration situated between the working position and the transport position.

Figure 5:
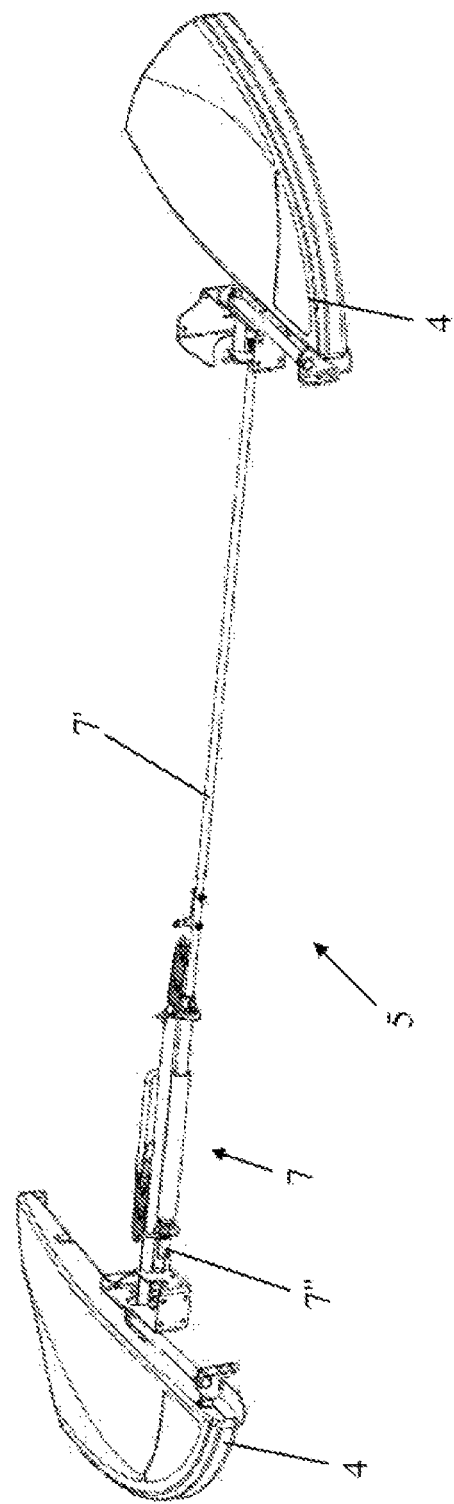
FIGS. 5 and 6 are partial perspective views of an embodiment of a device for displacing the two protective means constituting part of the agricultural machine represented in FIGS. 1 and 2 and comprising the control circuit of FIGS. 3A and 3B, wherein the protective means are respectively represented in operational position (FIG. 5) and non-operational position (FIG. 6)
Figure 6:
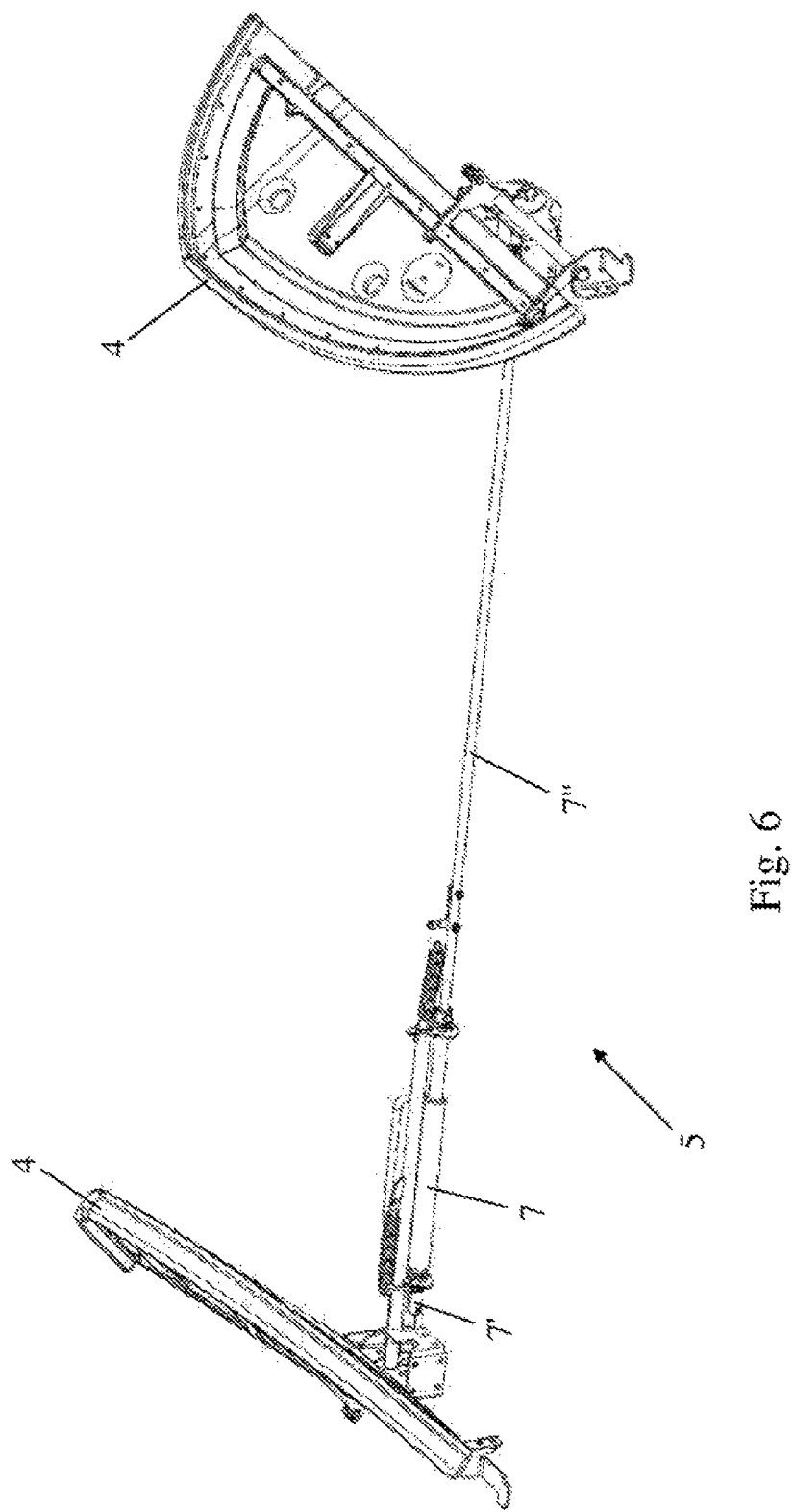

In agreement with an exemplary embodiment illustrated in particular in FIGS. 5 and 6, adjusting actuator 7 in question may be a single-effect actuator, for example of the electric, pneumatic or hydraulic jack type, which automatically returns to/is automatically disposed in its first configuration in the absence of energy potential furnished by external energy source 8, for example under the effect of a return urging force of potential nature, for example elastic.

Of course, machine 1 may have only a single movable protective means 4, for example forming a part of an overall protective device of all of the working tools 2, such as, for example, a movable part of a protective device such as provided in the aforesaid document FR 2726152.

In relationship with another embodiment, illustrated by way of example in FIGS. 5 and 6 of the attached drawings, agricultural machine 1 advantageously comprises at least two distinct movable protective means 4, for example in the form of hoods, covers or flexible or rigid lining elements, which are capable of being displaced together or separately by a common adjusting actuator 7 or by separate respective adjusting actuators.

In the attached figures, the two protective means 4 situated at the level of two opposite sides of machine 1 are displaced simultaneously by means of a single adjusting actuator 7, in the form of a jack, each end of which is connected by a linkage element 7" (bar, rod) to one of the said protective means 4.

Preferably, the said at least one or each adjusting actuator 7 is an adjusting actuator specifically dedicated to the displacement of the, one or many protective mean(s) 4.

In conformity with a first practical embodiment of mechanical nature, locking device 6 has a transformer means 12 provided with at least one motorized input element 13, wherein the element or each input element 13 is connected directly or indirectly, and at least kinematically to drive means 3 or to at least one working tool 2, wherein the input quantity of locking device 6 is constituted by a drive speed of the element or of input elements 13, and transformer means 12 converts this input quantity into an output quantity, which is used to steer the maneuvering of adjusting actuator 7 in question under the effect of the external energy.

In agreement with a second practical embodiment, preferably of electrical nature, locking device 6 comprises a steering device 14 for maneuvering adjusting actuator 7 under the effect of the external energy, wherein steering device 14 is substantially constituted by a sensor means 15 that measures the drive speed of drive means 3 or by a movement transmission member 3' connected kinematically to this latter and to at least one working tool 2, or else the working speed of this latter, and by a converter means 16, which transforms the drive and/or working speed measured by sensor means 15 into an output quantity.

In both of the aforesaid embodiments, the value of the output quantity determines the state of selector means 10, wherein this output quantity is preferably a linear or angular displacement of an output element 17 with which transformer means 12 or converter 16 is provided.

Two practical, simple and reliable variants of the aforesaid first embodiment are represented by way of examples in FIGS. 3 and 4 of the attached drawings.

As these latter show, transformer means 12 is, in these two variants of the same embodiment, a mechanical means that directly or indirectly exploits the centrifugal force resulting from the rotation of drive means 3 or of a movement transmission member 3' connected kinematically to this latter and to at least one working tool 2, or else from the rotation of at least one working tool 2, for example an arrangement of rotary weights or balls 13 forming a structure of the Watt governor type, wherein external energy source 8 is preferably a hydraulic energy source and steering of the maneuvering of adjusting actuator 7 in question is achieved by way of a slide-type hydraulic distributor forming selector means 10.

Figure 3C:
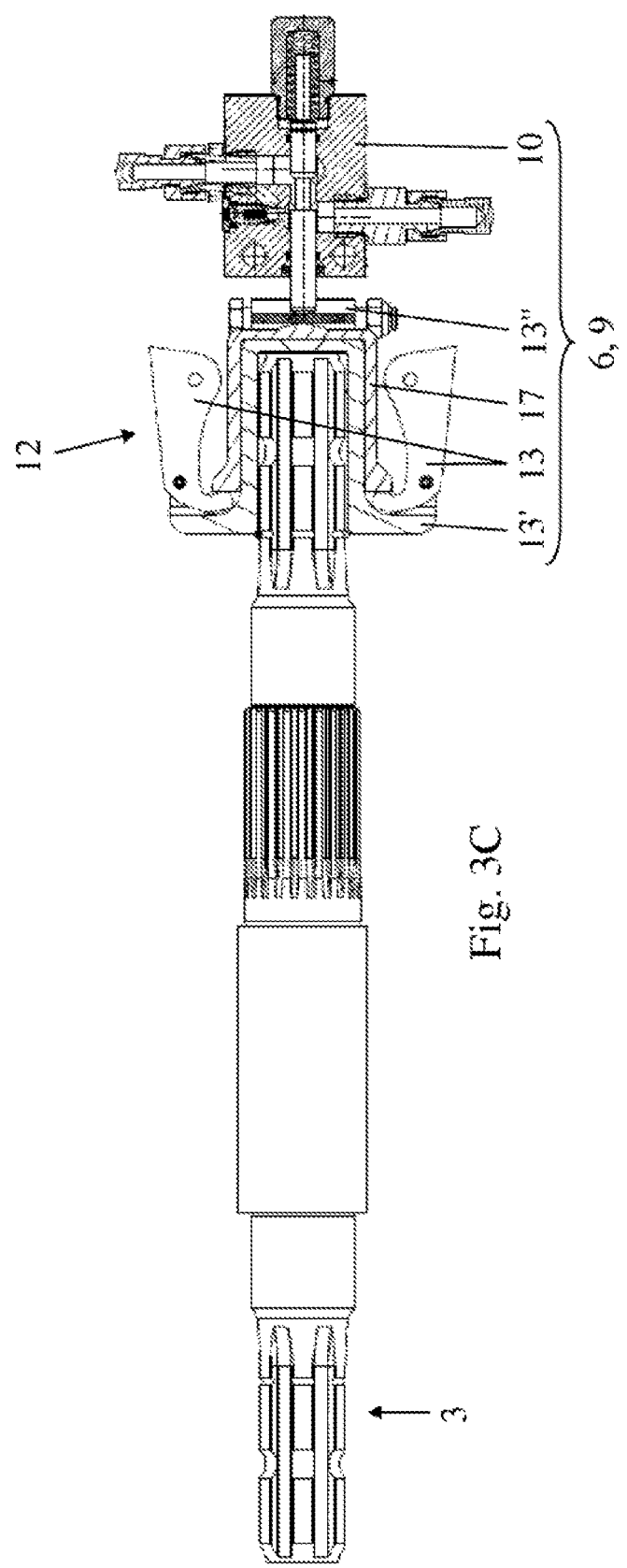
FIG. 3C is a sectional view (through an axial plane) of the control circuit represented in FIG. 3A.

In agreement with the first variant illustrated in FIG. 3C, weights 13 may be mounted pivotally on a ring 13' integral with a rotating element driven directly or indirectly by drive means 3. During the rotation of ring 13', weights 13 in the form of weighted hooks pivot around their point of articulation with ring 13' and by this fact force output element 17 in the form of a tappet to be displaced in translation.

Figure 4A:
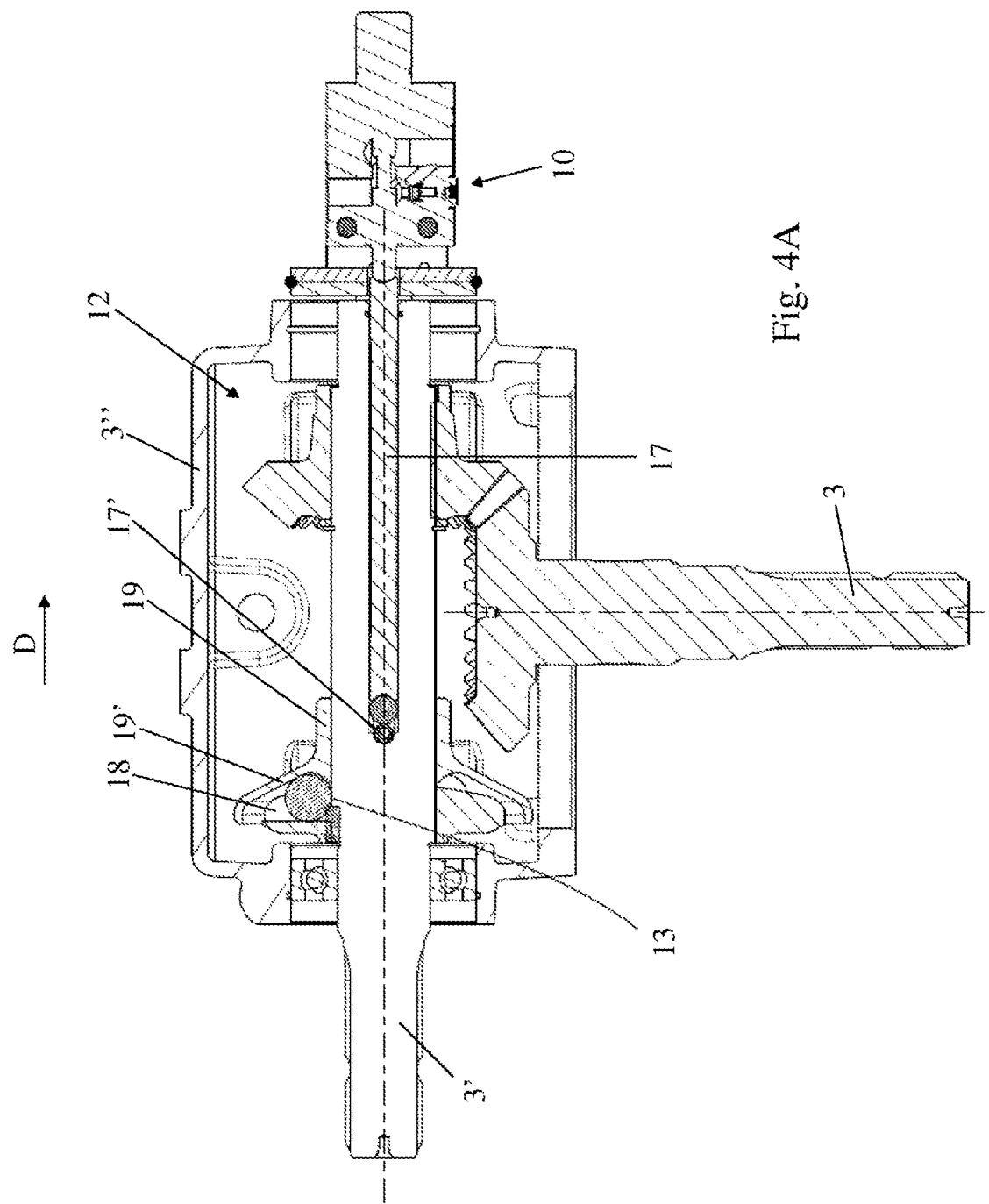
FIG. 4A is an elevation and sectional view through an axial plane of part of a control circuit constituting part of an agricultural machine according to a second variant of an embodiment of the invention, similar to that shown in FIG. 3C.
Figure 4B:
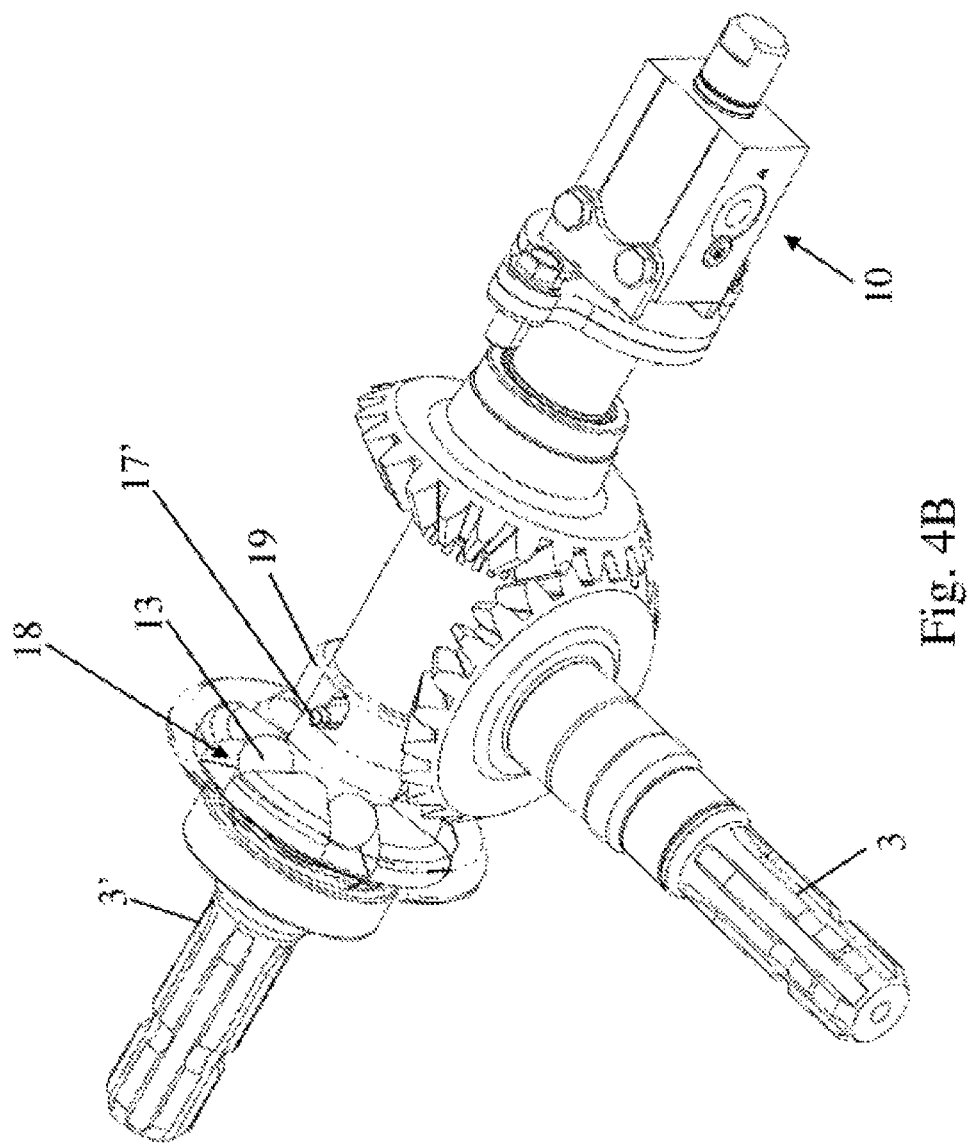
FIG. 4B is a partial perspective and transparent view of the object represented in FIG. 4A.

In agreement with the second variant illustrated in FIGS. 4A and 4B, balls 13 are mounted integrally in rotation and around an intermediate transmission shaft 3' connected kinematically to input shaft 3. These balls 13 are arranged individually in radially extending housings 18, closed by a sleeve 19 with an annular fin 19' in the form of a frusto-conical skirt and mounted slidingly on the said intermediate shaft 3'.

This sliding sleeve 19 is integral with an output element 17 in the form of a ram mounted in an axial passage made in intermediate shaft 3' (kinematic connection by way of a drive finger 17').

As is evident from FIGS. 4A and 4B, rotation of shaft 3' drives a forced displacement of balls 13 toward the exterior under the action of the centripetal force and causes a translation, in direction D of FIG. 4A, of sleeve 19 and therefore of ram 17 (for example, this latter has a finger that is received in an orifice of sleeve 19).

In both of the aforesaid variants, this displacement in translation of output element 17, in the form of tappet or ram, is transmitted to selector means 10 in the form of a slide valve, which by this fact changes state and positions non-return means 11 in series in the supply circuit of adjusting actuator 7 in question.

In order to distribute the pressure force exerted by output element 17 on selector means 10, and as illustrated in FIG. 3C, an intermediate distributor element (for example a pivoting plate) 13" may be provided.

The advantage of the variant of FIGS. 4A and 4B is that all of the constituent elements of transformer means 12 are grouped in casing 3" receiving the engagement pinions between input shaft 3 and intermediate shaft 3'.

Figure 9:
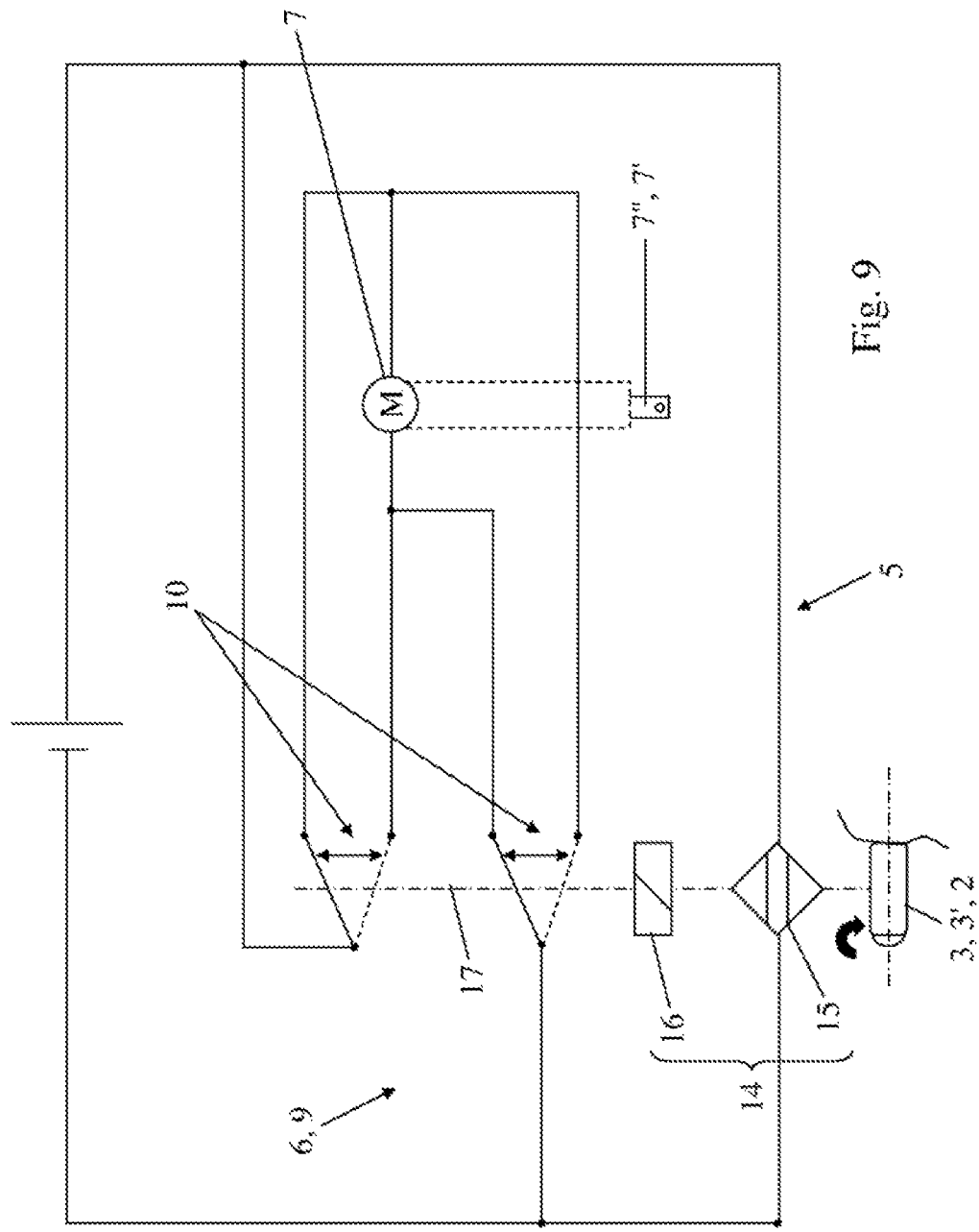
FIG. 9 is a simplified overview diagram of an electrical variant of the displacement device constituting part of the agricultural machine according to the invention.

FIG. 9 illustrates, in relation with the aforesaid practical second embodiment, an alternative electrical exemplary embodiment of displacement device 5, in which a sensor means 15 measures the drive or working speed of power takeoff 3, of a transmission shaft 3' or of a tool 2, wherein the measured value is transmitted to an analysis and control means 16, which delivers an output quantity (mechanical or electrical) to an element 17 capable of displacing a selector member 10 between two positions.

In the example represented in FIG. 9, member 10 consists of a pair of switches with common control, determining the supply (and therefore the drive) of an electric actuator 7 in the form of a reversible motor or jack, connected kinematically to at least one linkage element 7" integral with at least one guard 4.

To achieve optimum safety in the scope of employment of agricultural machine 1, the value of the threshold speed is preferably zero (total absence of drive and/or energization of the tool).

Although the attached figures present agricultural machine 1 in the form of a mower. Especially a front-mounted mower, it may also consist of another type of machine, such as, for example, more generally a haymaking machine.

In addition, agricultural machine 1 may consist of a machine connected to and driven by a tractor or of a motorized and self-propelled machine.

Of course, the invention is not limited to the embodiment described and represented in the attached drawings. Modifications are still possible, especially from the viewpoint of the constitution of the diverse elements or by substitution of equivalent techniques, albeit without going beyond the scope of protection of the invention.

The invention claimed is:

1. An agricultural machine comprising:
    a working tool displaced or transposed between a working position and a transport position;
    a drive means that drives the working tool and presents a variable drive speed, resulting in a variable working speed of the working tool;
    a movable protective means being displaced between an operational position and a non-operational position, wherein the working tool is surrounded or covered at least partly in the operational position and at least partly accessible in the non-operational position;
    a displacement device displacing the movable protective means between the operational position and non-operational position, wherein the displacement device includes an adjusting actuator supplied by an external energy delivered from an external energy source; and
    a locking device locking the movable protective means in the operational position or the non-operational position,
    wherein the displacement device includes a control circuit to control a transposition of the adjusting actuator to a first configuration or a second configuration, wherein the movable protective means is disposed in the operational position in the first configuration and disposed in the non-operational position in the second configuration,
    wherein the control circuit integrates the locking device of the movable protective means and controls the adjusting actuator from being disposed in the first configuration when the working tool is disposed in the working position,
    wherein the locking device automatically transforms an input quantity into a control quantity of the adjusting actuator, and the control quantity can assume a first control value used to prevent the transposition of the adjusting actuator beyond the first configuration,
    wherein the input quantity presents a value of the drive speed of the drive means or a value of the working speed of the working tool,
    wherein the control quantity assumes and preserves the first control value if the input quantity presents the value of the drive speed of the drive means or the value of the working speed of the working tool that is higher than a threshold speed.

2. An agricultural machine according to claim 1, when the working tool is displaced from the transport position toward the working position, the adjusting actuator is automatically transposed toward the first configuration by the control circuit.

3. An agricultural machine according to claim 1, when the working tool is in the working position and the control quantity assumes the first control value, the adjusting actuator remains in the first configuration by the control circuit during a subsequent displacement of the working tool toward the transport position or an intermediate position while the control quantity preserves or continues to assume the first control value, wherein the intermediate position is situated between the working position and the transport position.

4. An agricultural machine according to claim 1, the control quantity of the adjusting actuator assumes a second control value when the input quantity presents the value of the drive speed of the drive means or the value of the working speed of the working tool that is lower than or equal to the threshold speed, wherein the second control value is used to control the transposition of the adjusting actuator between the first configuration and the second configuration.

5. An agricultural machine according to claim 4, when the working tool is transposed or displaced toward the transport position or the intermediate position, the adjusting actuator is automatically transposed toward the second configuration while the control quantity assumes the second value.

6. An agricultural machine according to claim 1, wherein, the locking device includes a selector means connected to the external energy source to steer maneuvering or functioning of the adjusting actuator under effect of the external energy,
    a state of the selector means constitutes the control quantity of the adjusting actuator, and the selector means can present a first state constituting the first control value of the control quantity and a second state constituting the second control value of the control quantity.

7. An agricultural machine according to claim 6, wherein,
the adjusting actuator includes a first part configured to receive a flow of the external energy from the external energy source,
the selector means is connected to the first part, and
the first part receives the flow of the external energy from the external energy source when the adjusting actuator is transposed from the first configuration toward the second configuration.

8. An agricultural machine according to claim 6, wherein,
the selector means includes a non-return means that, when it is active, prevents the flow of the external energy from the external energy source toward the first part of the adjusting actuator, but permits the flow of the external energy in the opposite circulation direction, and
the non-return means is active when the selector means is in the first state.

9. An agricultural machine according to claim 7, wherein the selector means, in the second state, permits a bidirectional energy flow, both from the external energy source toward the first part and from the first part toward the external energy source.

10. An agricultural machine according to claim 1, wherein the external energy source presents a zero energy potential when the working tool is displaced toward or is disposed in the working position and a non-zero energy potential when the working tool is displaced toward or is disposed in the transport position or in the intermediate position.

11. An agricultural machine according to claim 1, wherein the adjusting actuator is a single-effect actuator, which automatically returns to or is automatically disposed in the first configuration in absence of energy potential furnished by the external energy source, or under effect of a return urging force of potential nature, or an elastic force.

12. An agricultural machine according to claim 1, comprising at least two distinct movable protective means which are capable of being displaced together or separately by a common adjusting actuator or by separate respective adjusting actuators.

13. An agricultural machine according to claim 11, wherein the adjusting actuator is specifically dedicated to displacement of the movable protective means.

14. An agricultural machine according to claim 1, wherein,
the locking device includes a transformer means including a motorized input element,
the motorized input element is connected at least kinematically to the drive means or to the working tool,
the input quantity of the locking device is constituted by a drive speed of the motorized input element, and
the transformer means converts the input quantity into an output quantity, which is used to steer maneuvering of the adjusting actuator under effect of the external energy.

15. An agricultural machine according to claim 1, wherein,
the locking device comprises a steering device for maneuvering the adjusting actuator under effect of the external energy, and
the steering device is constituted by a sensor means that measures the drive speed of the drive means or the working speed of the working tool, or by a movement transmission member connected kinematically to the drive means and the working tool, or by a converter means transforming the measured drive speed or the working speed into an output quantity.

16. An agricultural machine according to claim 14, wherein the value of the output quantity determines the state of the selector means.

17. An agricultural machine according to claim 14, wherein the output quantity is a linear or angular displacement of an output element with which the transformer means or converter is provided.

18. An agricultural machine according to claim 14, wherein the transformer means is a mechanical means that exploits centrifugal force resulting from a rotation of the drive means or the working tool, or from the movement transmission member.

19. An agricultural machine according to claim 1, wherein the value of the threshold speed is zero.

20. An agricultural machine according to claim 1, wherein the drive means is an input shaft connected to a power takeoff of a tractor, while being towed or carried by the tractor or an analogous vehicle.

21. An agricultural machine according to claim 1 is a haymaking machine.

22. An agricultural machine according to claim 1 is a mower.

* * * * *